(12) United States Patent
Eliash et al.

(10) Patent No.: US 11,442,635 B2
(45) Date of Patent: Sep. 13, 2022

(54) DATA STORAGE SYSTEMS AND METHODS FOR OPTIMIZED SCHEDULING OF BACKGROUND MANAGEMENT OPERATIONS

(71) Applicant: Western Digital Technologies, Inc., San Jose, CA (US)

(72) Inventors: Tomer Tzvi Eliash, Kfar Saba (IL); Alexander Bazarsky, Holon (IL); Yuval Grossman, Kiryat Ono (IL)

(73) Assignee: Western Digital Technologies, Inc., San Jose, CA (US)

( * ) Notice: Subject to any disclaimer, the term of this patent is extended or adjusted under 35 U.S.C. 154(b) by 73 days.

(21) Appl. No.: 16/245,173

(22) Filed: Jan. 10, 2019

(65) Prior Publication Data
US 2020/0225856 A1 Jul. 16, 2020

(51) Int. Cl.
*G06F 3/06* (2006.01)
*G06F 11/07* (2006.01)

(52) U.S. Cl.
CPC .......... *G06F 3/0625* (2013.01); *G06F 3/0659* (2013.01); *G06F 3/0679* (2013.01); *G06F 11/0757* (2013.01)

(58) Field of Classification Search
CPC ...... G06F 12/00; G06F 3/0625; G06F 3/0659; G06F 3/0679; G06F 11/0757
USPC .......................................................... 711/154
See application file for complete search history.

(56) References Cited

U.S. PATENT DOCUMENTS

| | | | |
|---|---|---|---|
| 2009/0132754 A1* | 5/2009 | Riska .................... | G06F 3/0676 711/111 |
| 2011/0060927 A1* | 3/2011 | Fillingim ............ | G06F 11/1441 713/320 |
| 2012/0203986 A1* | 8/2012 | Strasser ................ | G06F 3/0688 711/158 |
| 2017/0109101 A1* | 4/2017 | Hanson .................. | G06F 3/0659 |
| 2018/0191381 A1* | 7/2018 | Achtenberg ....... | H03M 13/1105 |
| 2018/0314448 A1* | 11/2018 | Grossman ........... | G06F 12/0238 |

* cited by examiner

*Primary Examiner* — Gautam Sain
(74) *Attorney, Agent, or Firm* — Morgan, Lewis & Bockius LLP

(57) ABSTRACT

Apparatus, media, methods, and systems for data storage systems and methods for optimized scheduling of background management operations. A data storage system may comprise a controller. The controller is configured to determine a timeout value of an adaptive timeout parameter of the data storage system. The controller is configured to determine whether a first host operation is received. The controller is configured to, when the first host operation is not received, determine whether the timeout value satisfies a threshold value. The controller is configured to, when the timeout value satisfies the threshold value, cause one or more background management operations to be executed at the data storage system.

20 Claims, 9 Drawing Sheets

DATA STORAGE SYSTEMS AND METHODS FOR OPTIMIZED SCHEDULING OF BACKGROUND MANAGEMENT OPERATIONS

BACKGROUND

Overall data storage system power consumption and memory latency may affect user experience. To reduce the adverse impact, data storage systems perform various background management operations. To efficiently reduce overall power consumption and memory latency, such background management operations are generally scheduled to be performed while commands from a host system are not received at a data storage system. However, the accuracy of predicting when a data storage system may receive commands from a host system when using existing techniques is low, which results in sub-optimal scheduling of background management operations. Thus, the likelihood of minimizing overall data storage system power consumption and memory latency is reduced.

The description provided in the background section should not be assumed to be prior art merely because it is mentioned in or associated with the background section. The background section may include information that describes one or more aspects of the subject technology, and the description in this section does not limit the invention.

Figure 1:
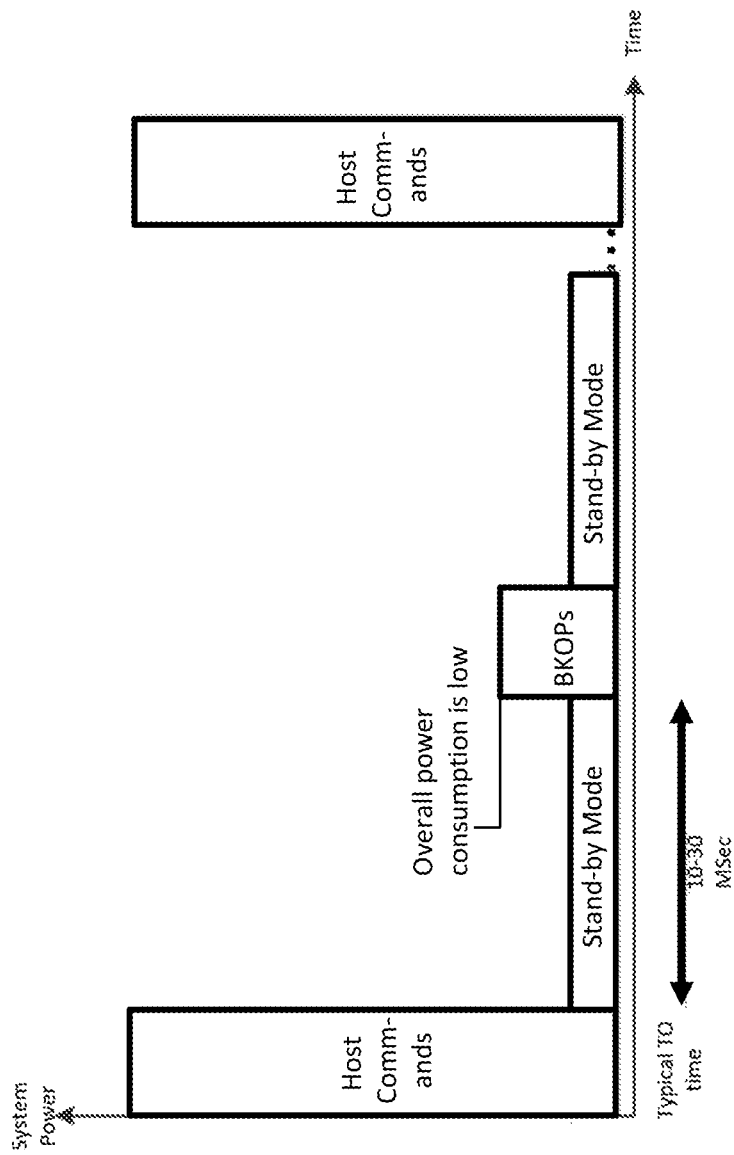
FIG. 1 depicts an example graph diagram illustrating an overall system power consumption using a constant timeout value and the prediction that a host command is accurate.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various configurations of the subject disclosure and is not intended to represent the only configurations in which the subject disclosure may be practiced. The appended drawings are incorporated herein and constitute a part of the detailed description. The detailed description includes specific details for the purpose of providing a thorough understanding of the subject disclosure. However, it will be apparent to those skilled in the art that the subject disclosure may be practiced without these specific details. In some instances, structures and components are shown in block diagram form in order to avoid obscuring the concepts of the subject disclosure. Like components are labeled with identical element numbers for ease of understanding.

The present description relates in general to data storage systems and methods, and more particularly to, for example, without limitation, data storage systems and methods for optimized scheduling of background management operations. Performance of a data storage system may be measured based on power consumption and memory latency of the data storage system. Power consumption and memory latency of the data storage system may be based on operational behavior of one or more devices of the data storage system, such as one or more non-volatile memory devices of the data storage system. To satisfy higher performance requirements of a data storage system, more complex device operational management schemes are implemented. Such management schemes generally include various management operations. To reduce degradation of the data storage system performance, such management operations may be run as background management operations, typically when a host system that is operably coupled to the data storage system is idle. In some implementations, a data storage system coupled to a host system may be referred to as an overall system. In some implementations, a host system may be idle or in an idle state when the host system is not transferring commands to the storage system. When a host system transfers or sends commands to a storage system, the host system is in a high power mode or is using more of the power budget of an overall system than a data storage system. Thus, a delay in sending a response to the host system for the command from the host system may cause the host system to consume more power and affect the power requirements of the overall system. Furthermore, once a background operation is initiated, it may consume several processor cycles, power, and other computing resources to complete, which may further delay the processing of any host command and subsequently affect the response time or cause further delay in sending a response to the host system, thus increasing memory latency of the data storage system. Therefore, to reduce delays in sending responses to the host system, a data storage system may be configured to prioritize processing of host commands over background management operations.

To ensure that processing of host commands is prioritized and not delayed or interfered by any background management operations, a data storage system may be configured to initiate processing of the background management operations (BKOPs) based on a timeout parameter that is configured to store a timeout value. The timeout value may be configured to be a certain duration of time that the data storage system may wait before initiating any background management operations. The duration of such a timeout value may be selected such that the time period, after the duration of the timeout value expires, represents a time period in which the likelihood of receiving a new host command is expected to be low. Such a timeout value, however, is a constant timeout value, and may be predetermined, without taking into consideration any current operational conditions of the data storage system, usage history of the data storage system by the host system, any current needs of performing any background management operations, or the like.

If the duration of the time period represented by the timeout value is accurate such that a host command is not received during that timeout period, i.e., successfully predicting that the likelihood of receiving a host command during such time period is low, then the background management operations (BKOPs) are processed without interfering with or causing any delay in processing of the host commands, as shown in FIG. 1. As can be seen in FIG. 1, this results in the overall power consumption of the system to be low or minimal for a longer time period, and does not degrade memory latency performance of the data storage system. The overall power consumption of the system, as can be seen in FIG. 1, is high when host commands are being executed and/or waiting to be executed by the data storage system. Most of the power being consumed while the host commands are being executed and/or waiting to be executed may be due to a processing unit, such as a central processing unit (CPU), of the host system waiting to receive a response for the host commands from the data storage system, a display device of the host system being in a high-power mode while the host system waits to receive a response for the host commands from the data storage system, and/or the like.

Moreover, as can be seen in FIG. 1, the overall power consumption of the system is low (e.g., around 5% of the power budget of the system) when the background management operations (BKOPs) are processed while host commands are not received by the data storage system, and they are not waiting to be executed by the data storage system. The overall power consumption of the system may be even lower when the data storage system is in a stand-by mode, as shown in FIG. 1. In some implementations, a stand-by mode may be a state of the data storage system when the data storage system is not receiving any host commands, there are no host commands being executed or waiting to be executed, and there are no background management operations being executed or waiting to be executed.

Figure 2:
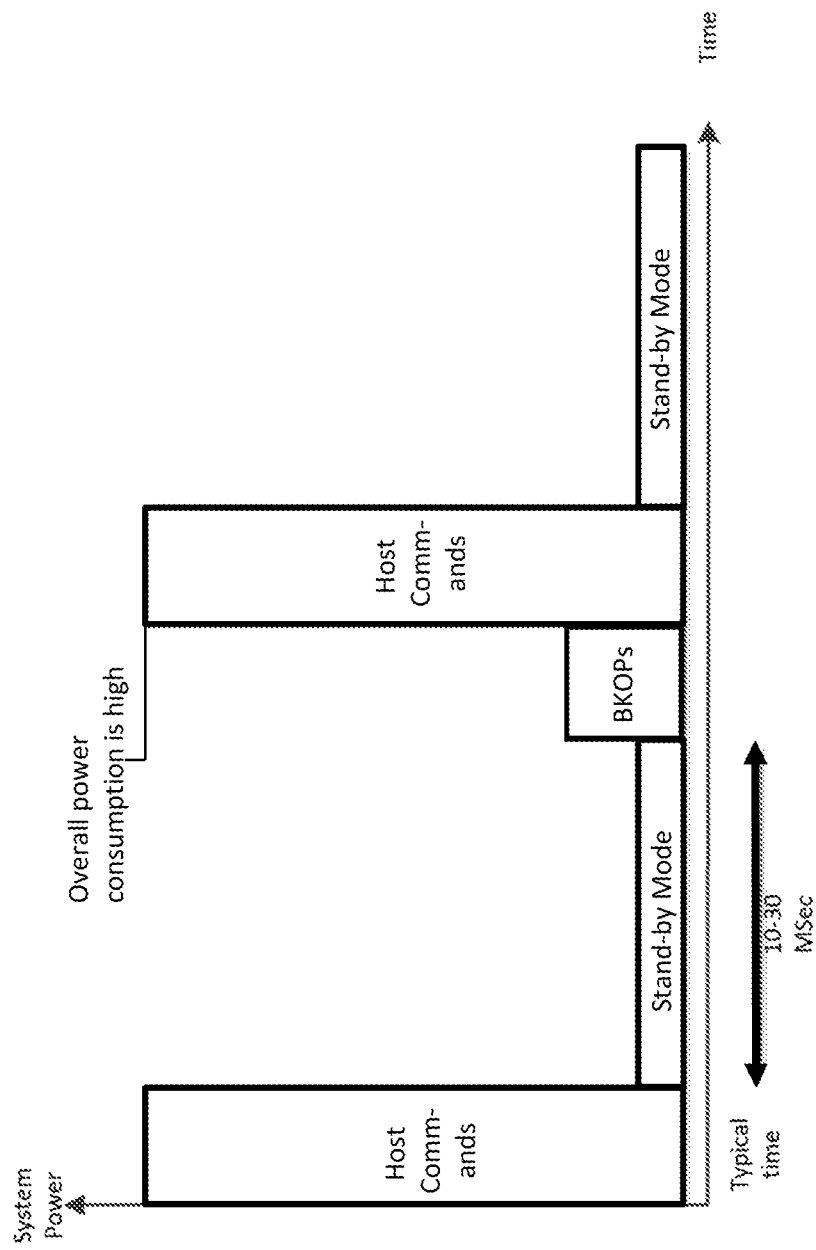
FIG. 2 depicts an example graph diagram illustrating an overall system power consumption using a constant timeout value and the prediction of host command is inaccurate.

However, if the prediction (e.g., a prediction that host commands will not be received or have a low likelihood of being received during the time period represented by the constant timeout value) is not successful or is not accurate, then execution of one or more background management operations, while host commands are being received, may delay the processing of host commands and/or delay the response to the processing of the host commands. This may result in larger power consumption by the overall system for a longer period of time, as shown in FIG. 2. For example, the delay in processing the host commands may cause the host system to remain in a high power mode and not return to a low power mode. Furthermore, the delay in processing host commands and/or delay in providing a response to the host system for processing the host commands may increase memory latency of the data storage system, thus reducing the performance of the data storage system and/or resulting in poor power consumption performance. Moreover, even if such a constant timeout value is predetermined to be a large enough value that receiving host commands is least likely, then processing of the background management operations may become very critical and not performing background management operations for such a long time may affect performance of the data storage system. In such situations, the number of background management operations that are to be performed may also increase, which may result in more resources of the data storage system being consumed for processing such operations and further deteriorate performance of the data storage system.

Additionally, if a background operation is being processed when a host command is received, then termination of the background operation may result in additional computing cycles or power being consumed by the system, which may further exacerbate power consumption and performance issues of the storage system. Moreover, the constant timeout value fails to adapt to system usage and/or operational and performance changes. Therefore, accurately predicting when the host commands may be received, using a timeout value, by the storage system may result in improving storage system performance, reducing overall power consumption by a system comprising storage system and a host system, and further reducing latency of the storage system. Additional details of the determining a timeout value is described in detail below and herein.

Figure 3:
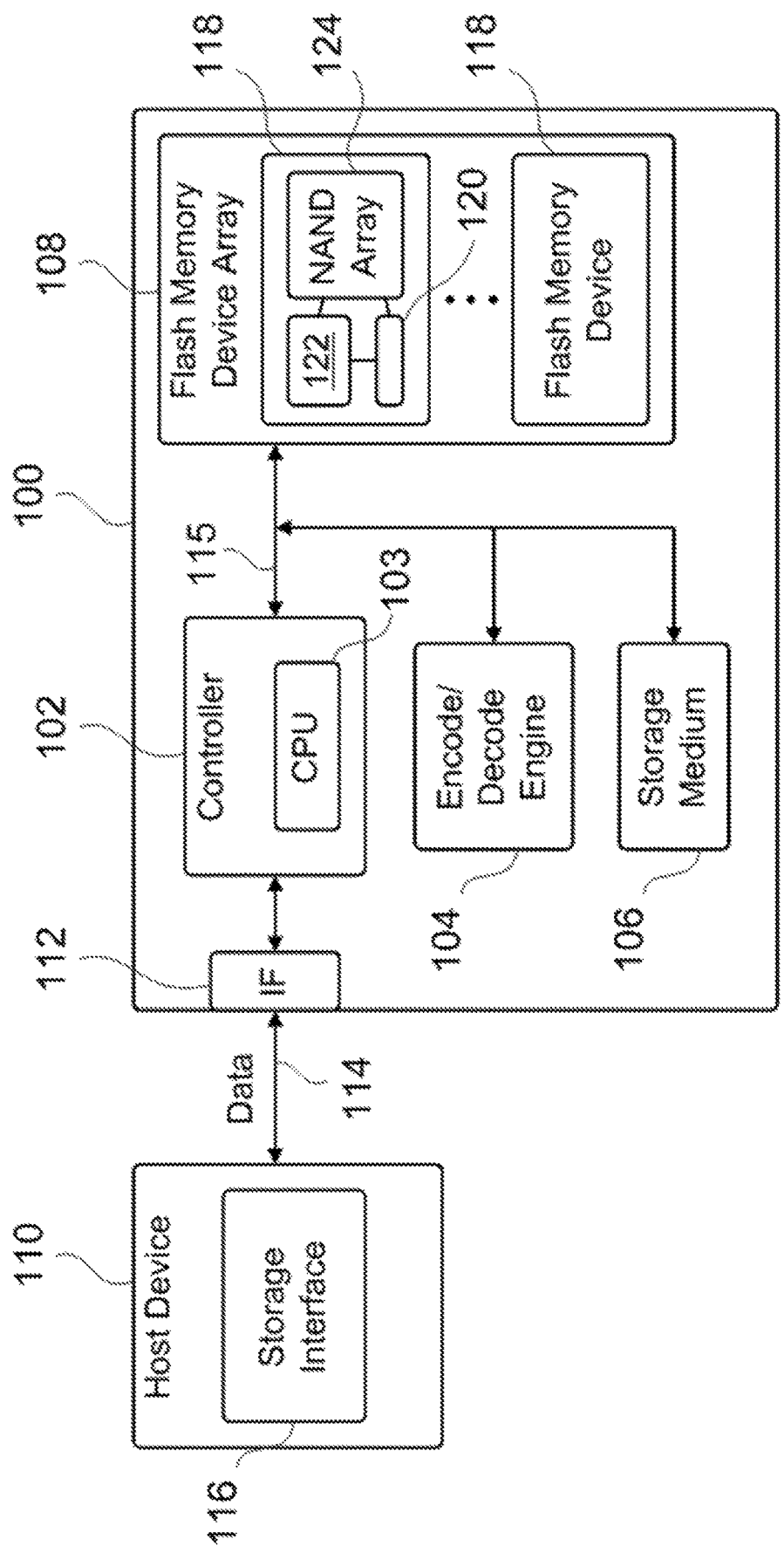
FIG. 3 is a block diagram illustrating components of a data storage system according to illustrative implementations.

FIG. 3 is a block diagram depicting example components of a data storage system 100, according to one or more aspects of the subject technology. Data storage system 100 includes, among other things, controller 102, encode/decode engine 104, storage medium 106, and non-volatile memory device array 108. As depicted in FIG. 3, data storage system 100 may be connected to a host device 110 via host interface 112.

Controller 102 may include several internal components (not shown) such as one or more processors 103, a read-only memory, a non-volatile component interface (for example, a multiplexer to manage instruction and data transport along a connection to non-volatile memory device array 108), an I/O interface, error correction circuitry, and the like. A processor of controller 102 may monitor and control the operation of the components in data storage controller 102. The processor and/or controller 102 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. In some implementations, one or more elements of controller 102 may be integrated into a single chip. In some implementations, the elements may be implemented on two or more discrete components.

Controller 102 may execute code or instructions to perform the operations and functionality described herein. For example, controller 102 may perform operations for managing request flow and address mappings, and to perform calculations and generate commands. One or more sequences of instructions may be stored as firmware on memory within controller 102. One or more sequences of instructions may be software stored and read from storage medium 106, non-volatile memory device array 108, or received from host device 110 (for example, via host interface 112). Storage medium 106 and non-volatile memory device array 108 include examples of machine or computer readable media on which instructions/code executable by controller 102 may be stored. Machine or computer readable media may generally refer to any tangible and non-transitory medium or media used to provide instructions to controller 102, including both volatile media, such as dynamic memory used for storage media or for buffers within controller 102, and non-volatile media, such as electronic media, optical media, and magnetic media. The operations and functionality described herein also may be implemented in hardware using logic circuits, for example, or a combination of hardware and software/firmware.

In some aspects, storage medium 106 represents the volatile memory used to temporarily store data and information used to manage data storage system 100. According to aspects of the present disclosure, storage medium 106 is a random access memory (RAM) such as double data rate (DDR) RAM. Other types of RAM also may be used to implement storage medium 106. Storage medium 106 may be implemented using a single RAM module or multiple RAM modules. While storage medium 106 is depicted as being distinct from controller 102, it is understood that storage medium 106 may be incorporated into controller 102 without departing from the scope of the present disclosure. Alternatively, storage medium 106 may be a non-volatile memory such as a magnetic disk, flash memory, peripheral SSD, and the like.

Host interface 112 may be coupled to host device 110, to receive data from and send data to host device 110. Host interface 112 may include both electrical and physical connections for operably coupling host device 110 to controller 102. Host interface 112 may communicate data, addresses, and control signals between host device 110 and controller 102. In this manner, controller 102 may store data received from host device 110 in non-volatile memory device array 108 in response to a write command from host device 110, and to read data stored in non-volatile memory device array 108 and to transfer the read data to host device 110 via host interface 112 in response to a read command from host device 110.

Host device 110 represents any device that may be coupled to data storage system 100 and to store data in data storage system 100. Host device 110 may be a computing system such as a personal computer, a server, a workstation, a laptop computer, PDA, smart phone, and the like. Alternatively, host device 110 may be an electronic device such as a digital camera, a digital audio player, a digital video recorder, and the like.

As further depicted in FIG. 3, host device 110 and data storage system 100 may be in communication with each other via a bus 114. The bus may use suitable interfaces standard including, but not limited to, serial advanced technology attachment (SATA), advanced technology attachment (ATA), small computer system interface (SCSI), PCI-extended (PCI-X), fiber channel, serial attached SCSI (SAS), secure digital (SD), embedded multi-media card (EMMC), universal flash storage (UFS) and peripheral component interconnect express (PCIe). According to some aspects, data storage system 100 may include pins (or a socket) to mate with a corresponding socket (or pins) on host device 110 to establish an electrical and physical connection.

Controller may include an internal system bus 115. System bus 115 may include a combination of a control bus, address bus, and data bus, and connect the components of controller 102 (e.g., a processor and/or memory therein) with other components of data storage system 100, including encode/decode engine 104, storage medium 106, non-volatile memory device array 108, and host interface 112. Data is transferred between the various components over system bus 115. System bus 115 may reside partially external and partially internal to controller 102.

Host device 110 and data storage system 100 may be in communication with each other via a wired or wireless connection and may be local to or remote from one another. According to one or more other aspects, data storage system 100 (or host interface 112) includes a wireless transceiver to place host device 110 and data storage system 100 in wireless communication with each other.

Controller 102 may receive data and/or storage access commands from a storage interface module 116 (e.g., a device driver) of host device 110. Storage access commands communicated by the storage interface module 116 may include read and write commands issued by the host device 110. Read and write commands may specify a logical address, e.g., logical block addresses (LBAs) used to access data stored in the data storage system 100. Controller 102 may execute commands in the non-volatile memory device array 108 in response to commands received from storage interface module 116.

Non-volatile memory device array 108 may include multiple non-volatile memory devices 118. A non-volatile memory device 118 represents a non-volatile memory device for storing data. According to aspects of the subject technology, non-volatile memory device 118 includes, for example, a NAND flash memory. Each non-volatile memory device 118 may include a single non-volatile memory chip or die, or may include multiple non-volatile memory chips or die. For example, within non-volatile memory device array 108, some of the non-volatile memory devices 118 may comprise one non-volatile die while others may comprise more than one non-volatile die. Non-volatile memory device 118 is not limited to any particular capacity or configuration. For example, the number of physical blocks, the number of physical pages per physical block, the number of sectors per physical page, and the size of the sectors may vary within the scope of the subject technology.

Non-volatile memory devices 118 may be arranged in multiple channels, with each channel having one or more non-volatile memory devices 118. A non-volatile memory device 118 may include one or more non-volatile memory interfaces (not shown). Each non-volatile memory interface interfaces the controller 102 to one of the non-volatile memory devices via a corresponding channel. Each of the channels (not shown) may be implemented using one or more physical I/O buses coupled between one of the non-volatile memory interfaces and the corresponding non-volatile device(s). Each channel allows the corresponding non-volatile memory interface to send read, write and/or erase commands to the corresponding non-volatile memory device. Each non-volatile memory interface may include a register (e.g., First-In-First-Out (FIFO) register) that queues read, write and/or erase commands from the controller 102 for the corresponding non-volatile memory device. Although the term "channel," as used above, referred to the bus coupled between a non-volatile memory interface and the corresponding non-volatile memory device, the term "channel" may also refer to the corresponding non-volatile memory device that is addressable through a bus (e.g., system bus 115).

Non-volatile memory device 118 may have a standard interface specification. This standard ensures that chips from multiple manufacturers can be used interchangeably. The interface of non-volatile memory device 118 may be used to access internal registers 120 and an internal non-volatile memory controller 122. In some implementations, registers 120 may include address, command, and/or data registers, which internally retrieve and output the necessary data to and from a NAND memory cell array 124. By way of example, memory cell array 124 may comprise a single-level cell (SLC) memory, a multi-level cell (MLC) memory, a three-level cell (TLC) memory device, etc. In some aspects, the non-volatile memory device array 108 may comprise one or more hybrid memory devices that may function in one or more of a SLC, MLC or TLC mode. Other types of non-volatile memory such as 3D NAND flash memory also are contemplated in the subject technology.

Data register (e.g., of registers 120) may include data to be stored in memory cell array 124, or data after a fetch from memory cell array 124, and may also be used for temporary data storage and/or act like a buffer. An address register may store the memory address from which data will be fetched to host device 110 or the address to which data will be sent and stored. In some aspects, a command register is included to control parity, interrupt control, and the like. In some aspects, internal non-volatile memory controller 122 is accessible via a control register to control the general behavior of non-volatile memory device 118. Internal non-volatile controller 122 and/or the control register may control the number of stop bits, word length, receiver clock source, and may also control switching the addressing mode, paging control, co-processor control, and the like.

Encode/decode engine 104 represents one or more components that may encode and/or decode code words to be stored in and/or read from the non-volatile memory device array 108. Encode/decode engine 104 may include an encoder and a decoder. The decoder may include a hard decoder and a soft-decision ECC decoder. Encode/decode engine 104 may encode data received from host device 110 and decode code words read from the non-volatile memory device 118 before sending the decoded data to the host. In some implementations, encode/decode engine 104 may comprise one or more memory devices and/or one or more processing units used to perform error correction (e.g., using LDPC, BCH, or turbo codes). Encode/decode engine 104 may also include a soft information module that determines and/or maintains soft metric inputs for encoding and decoding operations. While encode/decode engine 104 is depicted as being distinct from controller 102, it is understood that encode/decode engine 104 may be incorporated into controller 102 without departing from the scope of the present disclosure.

Figure 4:
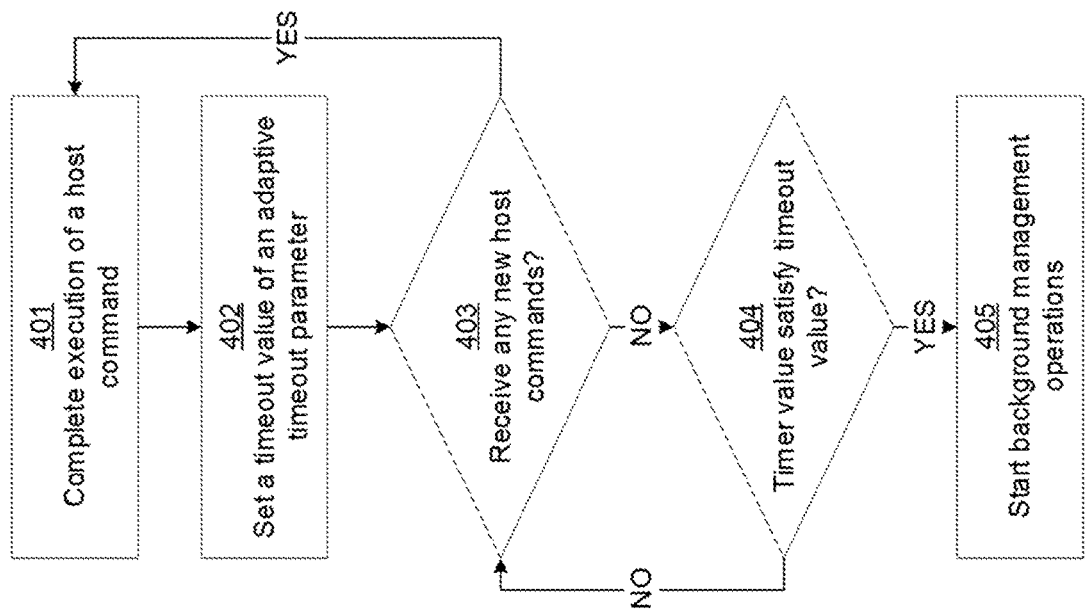
FIG. 4 is a flow chart of an example method of setting a timeout value of an adaptive timeout parameter and starting background management operations based on the timeout value of the adaptive timeout parameter according to illustrative implementations.

As described above, the controller 102 may be configured to update or set a timeout value of an adaptive timeout parameter rather than using a static or constant timeout value to improve the accuracy of predicting when a host command from a host system may be received by a data storage system. Turning now to FIG. 4, there is shown a flowchart illustrating a process of updating or setting a timeout value of an adaptive timeout parameter and starting background management operations based on the timeout value of the adaptive timeout parameter. For the purpose of illustrating a clear example, components of the data storage system 100 shown and described with reference to FIG. 3 are used to describe the process of updating or setting a timeout value of an adaptive timeout parameter and starting background management operations based on the timeout value of the adaptive timeout parameter.

The method 400 includes completing execution of a host command by a data storage system, such as the data storage system 100 (block 401). The controller, such as the controller 102, of the data storage system may be configured to process the host commands received from a host system communicatively coupled to the data storage system 100. In some implementations, the controller 102 may be configured to determine whether execution of any host commands is yet to be completed or initiated. In some implementations, the controller 102 may be configured to receive an input that indicates whether there are any host commands that are yet to be completed or initiated and the controller 102 may be configured to determine whether there are any host commands that are yet to be completed or initiated based on the received input.

The controller 102 sets a timeout value of an adaptive timeout parameter (block 402). The controller 102 may be configured to set a timeout value based on a determined timeout value. The controller 102 may be configured to determine a timeout value based on one or more factors. Examples of such factors, include, but are not limited to, severity of the criticality levels of the background management operations, a random generated variable value, output of a machine learned model indicating a likelihood of receiving a host command, and the like. Examples of background management operations include, but are not limited to, a read scrub operation performed to move one or more codewords with a high bit error rate (BER) from a physical location in a non-volatile memory device to new physical location in the non-volatile memory device. Other examples of background management operations include, but are not limited to threshold calibration operations performed to find optimal read voltages for one or more memory blocks of a non-volatile memory device. In some implementations, the controller 102 may be configured to determine a timeout value based on one or more of the various factors. For example, in some implementations, the controller 102 may be configured to determine a timeout value based on criticality levels of the background management operations and/or a random generated variable value. Similarly, in some implementations, the controller 102 may be configured to determine a timeout value based on a random generated variable value and/or an output of a machine learned model indicating a likelihood of receiving a host command. In some implementations, the controller 102 may be configured to determine a timeout value based on criticality levels of the background management operations and/or an output of a machine learned model indicating a likelihood of receiving a host command. In some implementations, the controller 102 may be configured to determine a timeout value based on criticality levels of the background management operations, a random generated variable value, and/or an output of a machine learned model indicating the likelihood of receiving a host command/operation. In one or more examples, a timeout value may be a timeout value of an adaptive timeout parameter. Additional details of determining a timeout value are descried herein with reference to FIGS. 5, 6, 7, 8, and 9.

The controller 102 determines whether the data storage system 100 received any new host commands from a host system, such as the host system 110 (block 403). If the controller 102 determines that a new host command is received (YES' at block 403), the method 400 continues to block 401, and the data storage system 100 initiates and/or completes the execution of the received host commands. In some implementations, each of the host commands and the background management operations may be associated with a priority level. In some implementations, a priority level of a host command may be higher than a priority level of the background management operations. If the controller 102 determines that a new host command is not received (NO' at block 403), the method 400 continues to block 404. The controller 102 determines whether a timer values satisfies the timeout value (block 404). In some implementations, a timer value may be the value of a counter that is configured to store a period of time that has expired since the timeout value of the adaptive timeout parameter is set. The controller 102 may be configured to update the timer value periodically. The frequency or period at which the timer value is updated (e.g., increased, decreased) may be based on a clock rate and/or a clock signal of the data storage system 100. For example, the timer value may be updated on a rising or falling edge of a clock signal.

The controller 102 may be configured to determine whether the timer value satisfies the timeout value based on a comparison of the timer value to the timeout value. In some implementations, the controller 102 may be configured to initialize the timer value to zero and increase the timer value periodically, and the controller 102 may determine that the timer value satisfies the timeout value if the timer value is equal to or greater than the timeout value. In some implementations, the controller 102 may be configured to initialize the timer value to the timeout value and decrease the timer value periodically, and the controller 102 may determine that the timer value satisfies the timeout value if the timer value is less than or equal to the timeout value.

In some implementations, the controller 102 may be configured to determine that a timer value satisfies the timeout value if the timeout value of the adaptive timeout parameter expires. The controller 102 may be configured to determine that the timeout value has expired if the timeout value equals zero. In some implementations, the controller 102 may be configured to periodically decrease the timeout value of the adaptive timeout parameter until the timeout value equals to zero, and determine that the timeout value expired when the timeout value equals to zero. The controller 102 may be configured to decrease the timeout value at a frequency or period equal based on a clock rate and/or a clock signal of the data storage system 100, such as on a rising or falling edge of a clock signal.

If the controller 102 determines that the timer value does not satisfy the timeout value (NO' at block 404), then the method 400 continues to block 403. If the controller 102 determines that the timer value does satisfy the timeout value (YES' at block 404), then the method 400 continues to block 405. The controller 102 starts or initiates one or more background management operations (block 405).

Figure 5:
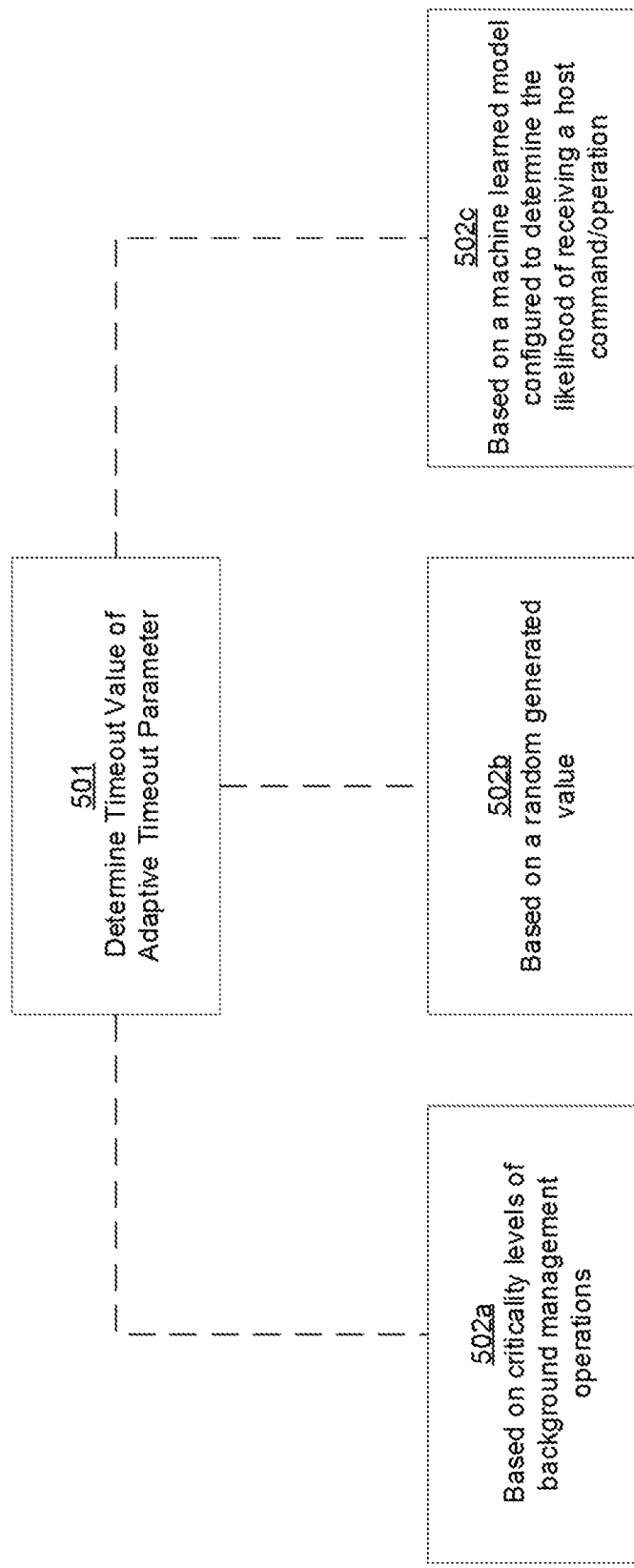
FIG. 5 is an example method of determining a timeout value according to illustrative implementations.

Turning now to FIG. 5, there is shown a process of determining a timeout value of an adaptive timeout parameter. As described above, the controller 102 sets a timeout value based on a determined timeout value. For the purpose of illustrating a clear example, components of the data storage system 100 shown and described with reference to FIG. 3 are used to describe the process of determining a timeout value of an adaptive timeout parameter.

The method 500 includes determining a timeout value of an adaptive timeout parameter (block 501). As described above, the controller 102 may be configured to determine the timeout value of the adaptive timeout parameter based on one or more factors, such as severity of the criticality levels of the background management operations (block 502a), a random generated variable value (block 502b), output of a machine learned model indicating a likelihood of receiving a host command (block 502c), and the like. As described above, in some implementations, the controller 102 may be configured based on a combination of the above one or more factors.

The controller 102 may be configured to determine a timeout value based on severity of the criticality levels of the background management operations (block 502a). The controller 102 may be configured to determine severity of the criticality levels of the background management operations based on one or more factors. Examples of factors include, but are not limited to, the number of background management operations that need to be processed, urgency of the background management operations, type of background management operations, and the like. The controller 102 may be configured to determine the number of background management operations that need to be processed based on one or more factors, such as, utilization of the storage system, types of host commands, operational environment factors, voltage events of the storage system. In some implementations, the controller 102 may be configured to determine the utilization of the storage system based on determining the number of host commands processed within a certain period of time. In some implementations, the controller 102 may be configured to determine a numerical weight or rank based on a set of rules that specify a certain weight or rank for different number of host commands processed within the certain period of time. In some implementations, the set of rules may specify a certain weight or rank for different ranges of host commands processed within a certain period of time. For example, the set of rules may specify a certain weight or rank if the number of host commands processed within the last thirty minutes is between ten and nineteen, inclusive, and the set of rules may specify a different weight or rank if the number of host commands processed within the last thirty minutes is between twenty and twenty-nine, inclusive.

As described above, the controller 102 may be configured to determine the number of background management operations that need to be processed based on the type of host commands that have been processed. Examples of types of host commands include, but are not limited to, read data commands, write data commands, logical address schemes, and the like. In some implementations, a set of rules may specify a certain weight or rank for different host commands that have been processed. For example, the set of rules may specify that a read data command is assigned a certain weight or rank, a write data command is assigned a different weight or rank, and another type of host command is assigned yet another weight or rank. The controller 102 may be configured to assign certain weight or rank based on the type of host commands that have been processed and the set of rules. In some implementations, the controller 102 may be configured with one or more trained algorithms that specify a certain weight or rank based on the number of each type of host commands that have been processed.

The controller 102 may be configured to be determine changes in the values of the operational environment parameters, and determine the number of background management operations that need to be processed based on the changes in the values of the operational environment parameters. Examples of the operational environment parameters include, but are not limited to, parameters related to operating temperatures of the storage system, ambient temperatures of storage systems, and the like. In some implementations, the controller 102 may be configured to determine whether the values of the operational environment parameters or the determined changes in the values of the operational environment parameters satisfy one or more threshold values, and the controller 102 may be configured to determine the number of background management operations based on the whether the values of or the determined changes in the values of the operational environment parameters satisfy one or more threshold values. Furthermore, as described above, the controller 102 may be configured to determine the number of background management operations that need to be processed based on voltage events of the storage system. Examples of voltage events may include, but not limited to, power consumption of the storage system, changes in voltages, and the like. In some implementations, the controller 102 may be configured to identify various voltage events experienced by the storage system and track the voltage events over a period of time.

As described above, the controller 102 may be configured to determine criticality levels of the background management operations based on urgency of the background management operations. The controller 102 may be configured to determine an urgency grade or grades for one or more of the background management operations based on an analysis of data of certain parameters of and/or data related to the operation and/or management of the data storage system 100. Examples of such parameters or data include, but are not limited to, error rate of the data storage system 100 or error rate of one or more non-volatile memory devices or components, such as the non-volatile memory devices 118, data related density levels or fullness of one or more non-volatile memory devices 118, data related to wear leveling, data related to a number of blocks whose data may need to be relocated.

In some implementations, the controller 102 may be configured to determine whether a bit error rate (BER) of one or more non-volatile memory devices, such as non-volatile memory devices 118, satisfies a threshold value, and, based on that determination, determine an urgency grade for one or more background management operations and determine a timeout value for the adaptive timeout parameter based on the determined urgency grade. For example, if the controller 102 determines that the BER of one or more non-volatile memory devices 118 is greater than or equal to a threshold BER value, then the controller 102 determines a high urgency grade for and/or assign the high urgency grade to one or more background management operations. In some implementations, the controller 102 may be configured to determine a level of fullness of one or more non-volatile memory devices, such as non-volatile memory devices 118, and determine an urgency grade for one or more background management operations based on the level of fullness of the one or more non-volatile memory devices 118. For example, if the controller 102 determines that a level of fullness of a non-volatile memory device 118 is below or equal to a threshold level or value, then the controller 102 may be configured to determine and/or assign a low urgency grade to one or more background management operations. In some implementations, the controller 102 may be configured to determine and/or assign an urgency grade based on data related to wear-leveling. For example, the controller 102 may be configured to determine whether wear-leveling satisfies a threshold wear-leveling value by comparing data related to wear-leveling to the threshold wear-leveling value, and determine and/or assign a high urgency grade if the data related to wear-leveling is above or equal to the threshold wear-leveling and/or determine and/or assign a low urgency grade if the data related to wear-leveling is below the threshold wear-leveling.

In some implementations, the controller 102 may be configured to determine and/or assign different urgency grades to different background management operations based on analysis of different parameters and/or different data related to the operation and/or management of the data storage system 100. The controller 102 may be configured to identify different background management operations for different parameters and/or data related to the operation and/or management of the data storage system 100 based on a set of rules that specify one or more background management operations for one or more parameters and/or for data related to the operation and/or management of the data storage system 100. For example, if the BER of one or more non-volatile memory devices 118 is above or equal to a threshold value, then the controller 102 may determine and/or assign a high urgency grade to one or more background management operations such as read-scrub operations of one or more memory blocks of the one or more non-volatile memory devices 118. Similarly, if the level of fullness of one or more non-volatile memory devices 118 is above or equal to a threshold level of fullness, then the controller 102 may determine and/or assign a high urgency grade to one or more background management operations such as data relocation operations (e.g., relocation operations that relocate data from a single-level cell (SLC) to a multi-level cell (MLC)). As another example, if wear-leveling data is above or equal to a threshold wear-leveling value, then the controller 102 may determine and/or assign a high urgency grade to one or more background management operations such as operations that copy data from memory blocks with high program/erase (PE) cycles to memory blocks with low program/erase (PE) cycles.

The controller 102 may be configured to determine an overall urgency grade for the background management operations based on one or more urgency grades of one or more background management operations. In some implementations, the controller 102 may be configured to determine the overall urgency grade as high urgency grade if the number of one or more background management operations with a high urgency grade satisfies (e.g., above and/or equal to) a threshold value. In some implementations, the controller 102 may be configured to determine the overall urgency grade as a low urgency grade if the number of one or more background management operations is below a threshold value. In some implementations, urgency grades may be numerical values, and the controller 102 may be configured to calculate a statistical measurement based on the urgency grades of one or more background management operations and determine an overall urgency grade for the background management operations based on the statistical measurement. For example, the controller 102 may calculate an average urgency grade based on urgency grades of one or more background management operations and determine the overall urgency grade based on the average urgency grade (e.g., overall urgency grade is the average urgency grade). In some implementations, the controller 102 may be configured to determine whether an urgency grade is high, medium, or low, based on numerical value of urgency grade. For example, if the numerical value of the urgency grade is below and/or equal to a low urgency grade threshold value, then the controller 102 may determine that the urgency grade is low. As another example, if the numerical value of the urgency grade is above and/or equal to a medium urgency grade threshold value and below a high urgency grade threshold value, then the controller 102 may determine that the urgency grade is medium. As another example, if the numerical value of the urgency grade is above and/or equal to a high urgency grade threshold value, then the controller 102 may determine that the urgency grade is high.

Figure 6:
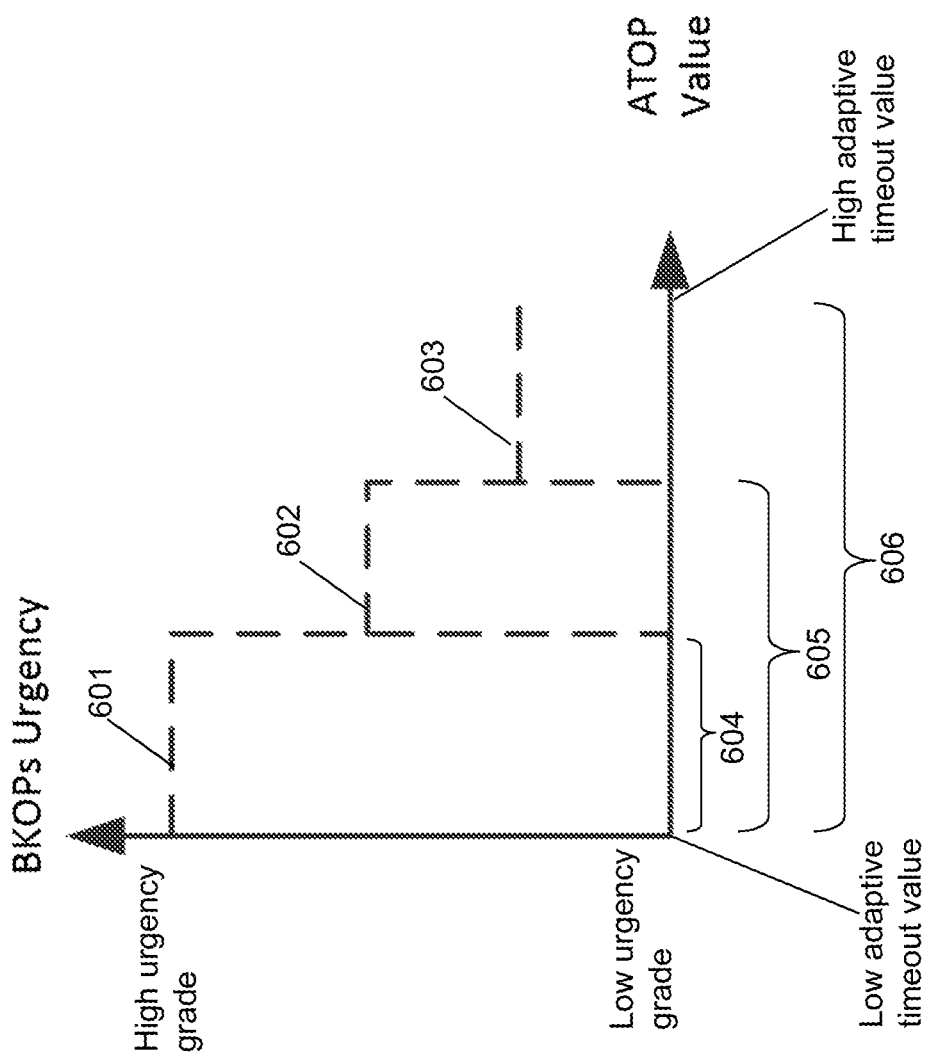
FIG. 6 depicts an example graph diagram illustrating the relationship between urgency of background management operations and a timeout value according to illustrative implementations.

The controller 102 determines a timeout value based on the urgency grades of the one or more background management operations. For example, the controller 102 may determine a timeout value based on the overall urgency grade or value of the overall urgency grade. The controller 102 may be configured to determine a timeout value inverse to the urgency grade of the one or more background management operations. In some implementations, the higher the urgency grades of one or more background management operations and/or the higher the overall urgency grade, the lower the timeout value determined by the controller 102. For example, as shown in FIG. 6, the controller 102 may determine a timeout value 604 for an urgency grade 601, a timeout value 605 for an urgency grade 602, a timeout value 606 for an urgency grade 603.

Figure 7:
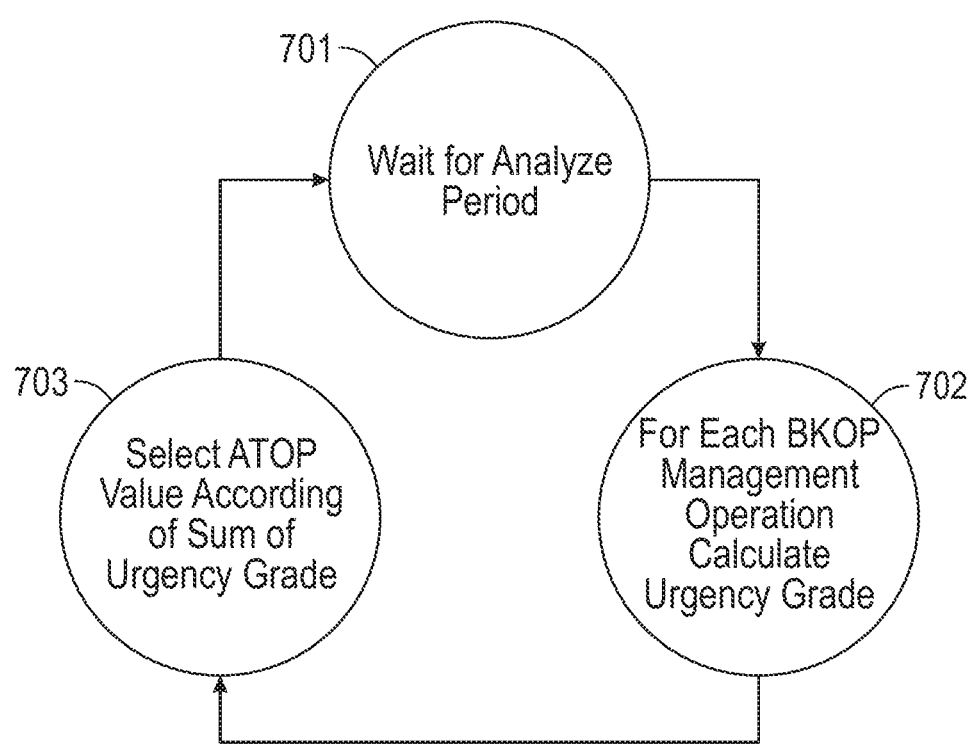
FIG. 7 is a flow chart of an example method of periodically updating a timeout value according to illustrative implementations.

The controller 102 may be configured to periodically analyze the data of certain parameters and/or or data related to the operation and/or management of the data storage system 100, and, based on the analysis, periodically update the urgency grades of one or more background management operations and/or the overall urgency grade. The controller 102 may be configured to periodically update the timeout value based on updates to the urgency grades of one or more background management operations and/or the overall urgency grade. An example method of periodically updating the urgency grades and periodically updating the timeout value is shown in FIG. 7. As shown in FIG. 7, the controller 102 may be configured to wait for a certain period of time after determining urgency grades (block 701). For each background management operation, the controller 102 may be configured to determine an urgency grade (block 702). The controller 102 may be configured to update the previously determined urgency grades with the newly determined urgency grades. The controller 102 may be configured to update the timeout value based on the updated urgency grades (block 703). In some implementations, the controller 102 may be configured to update the timeout value based on a statistical measurement (e.g., average) of the updated urgency grades.

Figure 8:
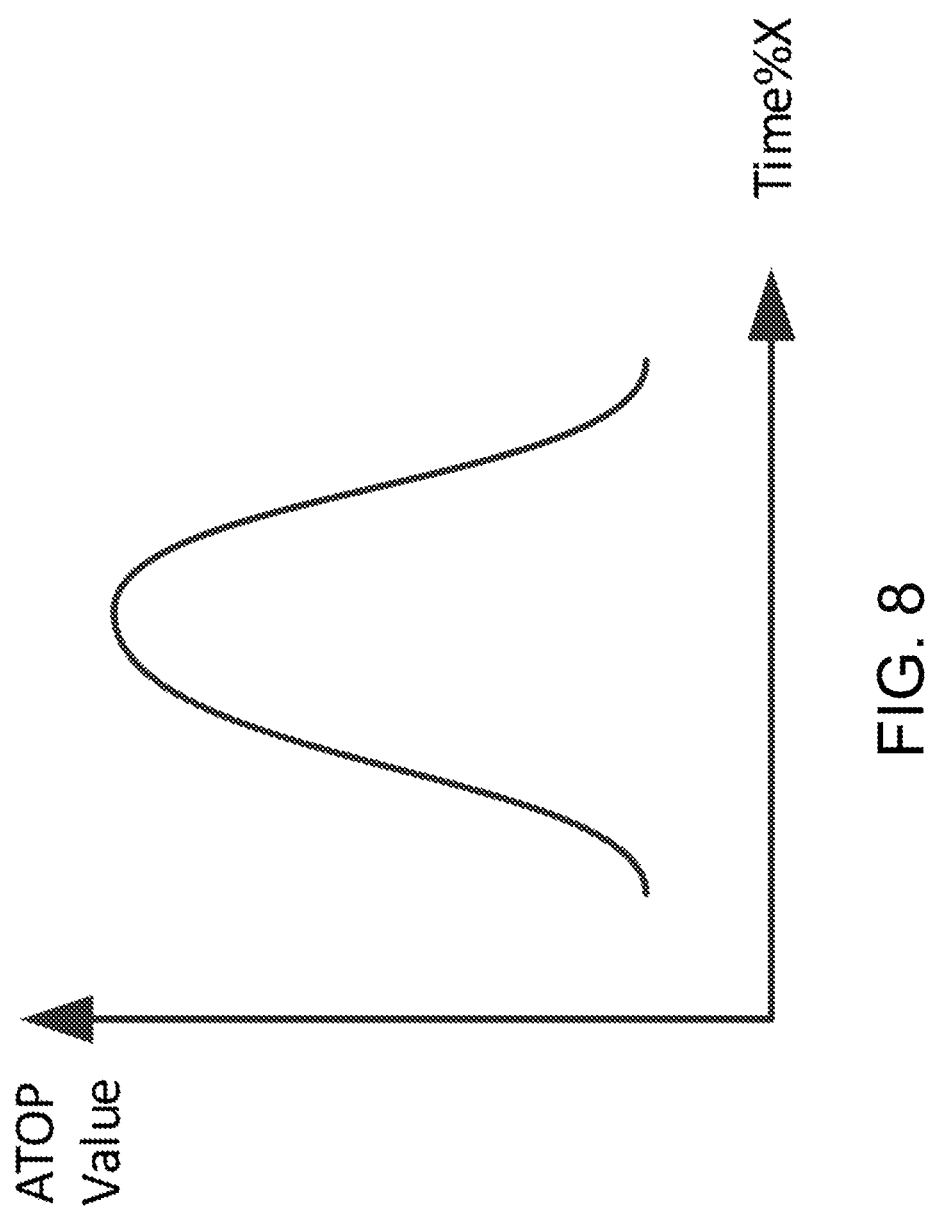
FIG. 8 depicts an example graph diagram illustrating randomly generated timeout values over a period of time according to illustrative implementations.

As described above, the controller 102 may be configured to determine the timeout value of the adaptive timeout parameter based on a random generated variable value (block 502b). The controller 102 may be configured to generate a random value for the adaptive timeout parameter. In some implementations, the controller 102 may be configured to generate a random timeout value within a range of timeout values. For example, the controller 102 may be configured to determine a random timeout value between a lower limit and an upper limit of timeout values. The controller 102 may be configured to generate a random value based on a current timeout value. In some implementations, the controller 102 may be configured to periodically generate a random timeout value and update the timeout value of the adaptive timeout parameter with the newly generated random timeout value. FIG. 8 illustrates an example of a random timeout value generated over a certain period of time. In some implementations, the controller 102 may be configured to determine a timeout value based on the criticality levels of the background management operations (block 502a) and the random timeout value. In some implementations, the controller 102 may be configured to determine a timeout value based on urgency grades of the background management operations and the generated random timeout value.

Figure 9:
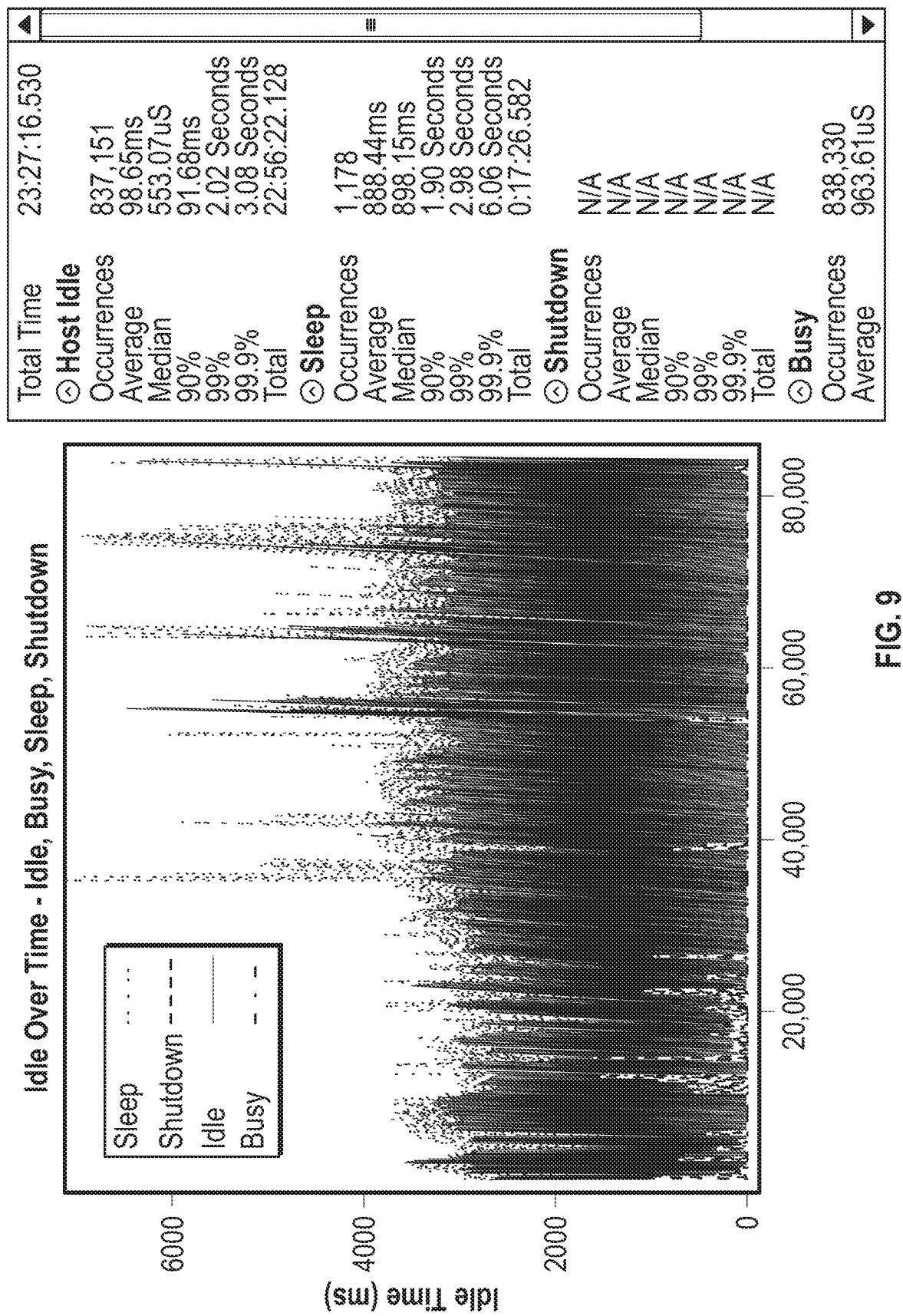
FIG. 9 depicts an example graph diagram illustrating usage history over a period of time according to illustrative implementations.

The controller 102 may be configured to determine the timeout value of the adaptive timeout parameter based on a machine learned model configured to determine the likelihood of receiving a host command or operation (block 502c). The machine-learned model may be comprised within the data storage system 100. For example, the machine-learned model may be comprised as a sub-module of the data storage system 100 that provides an input to the controller 102. The machine-learned may be trained and configured to determine a likelihood of receiving a host command based on usage history of the data storage system, such as the data storage system 100. FIG. 9 depicts an example graph of usage history of a data storage system. In some implementations, the usage history of the data storage system may be over a recent period of time (e.g., over a period of 24 hours, over last 7, 30, 90, 180 days, and/or the like).

The controller 102 may be configured to determine the timeout value based on an output of the machine-learned model that indicates the likelihood of receiving a host command. The output of the machine-learned model may specify an expected period of time before the next host command is received by the data storage system 100. In some implementations, such expected period of time is referred to as idle time before a host command may be received. The machine-learned model may be configured to determine a range of idle time values based on the usage history. The machine-learned model may be configured to divide the range of idle time values into different groups, and, based on the usage history, track the number of times the idle time is within each of the different groups using a counter for each of the different groups. For example, for a range of idle time values spanning from 0 milliseconds to 20 milliseconds, the machine-learned model may divide the range into six groups: 0-1000 milliseconds as one group, 1000-5000 milliseconds as a second group, 5000-10,000 milliseconds as a third group, 11,000-15,000 milliseconds as a fourth group, 15,000-20,000 milliseconds a fifth group, and greater than 20,000 milliseconds as a sixth group. Continuing with the example, the machine-learned model, based on the usage history, may determine the number of times the idle time is within each of the six groups using a different counter for each of the different six groups. In some implementations, the machine-learned model may be configured to increment the counter every time the idle time is within one of the groups. In some implementations, the machine-learned model may be configured to update the final counter values of each of the groups by a coefficient value. In some implementations, the machine learned model may be configured to track idle times across multiple days, days of a week (e.g., weekdays, weekends, holidays, and the like), different times of each day (e.g., idle times during morning hours, idle times during evening hours), and the like. In some implementations, the machine-learned model may be configured to determine an average length of busy time at different times of one or more days.

The machine-learned model may be configured to determine an expected idle time based on the counter values. The machine-learned model may be configured to determine an accuracy level for the idle time that indicates the likelihood that the expected idle time is accurate. The machine-learned model may be configured to specify or indicate the accuracy level for an expected idle time using a probability value, a confidence level, and the like. The machine-learned model may be configured to generate an output that specifies an expected idle time and the accuracy level for the expected idle time. For example, the machine-learned model may determine an expected idle time of 1200 milliseconds and an accuracy level of 70% as the likelihood or probability that the determined expected idle time is accurate. In some implementations, the machine-learned model may be configured determine multiple expected idle times based on the counter values, and, for each of the multiple expected idle times, the machine-learned model may be configured to determine an accuracy level that indicates the accuracy of that expected idle time. In some implementations, the machine-learned model may be configured to determine a ratio between a busy time and an idle time of the data storage system, such as the data storage system 100, using the usage history of the data storage system.

The controller 102 may be configured to determine the timeout value based on one or more expected idle times, and their accuracy levels. For example, if the output of the machine-learned model specifies four different idle times and an accuracy level for each of the expected idle times, the controller 102 may determine a timeout value as the idle time with the highest accuracy level.

As described above, the controller 102 may be configured to determine the timeout value based on a combination of the criticality levels of the background management operations, a random generated value, and/or the machine-learned model configured to determine the likelihood of receiving a host command. For example, in some implementations, the controller 102 may be configured to determine a criticality levels of the background management operations or urgency grades of the background management operations, and determine a maximum timeout value based on the determined criticality levels of the background management operations or the urgency grades of the background management operations. The controller 102 may generate a random timeout value using the maximum possible timeout value as the upper limit of the range of timeout values, and may determine a timeout value based on the generated random timeout value. The controller 102 may further adjust the determined timeout value based on one or more idle times and their respective accuracy levels specified in an output of the machine-learned model.

The blocks of the flowchart illustrated in FIGS. 4, 5, and 7 have been described as occurring sequentially. The subject technology is not limited to the described sequential performance of the illustrated process. One or more of the blocks may be performed in parallel with other blocks in the illustrated process. Other variations in the illustrated process are within the scope of the subject technology.

Various examples of aspects of the disclosure are described below. These are provided as examples, and do not limit the subject technology.

In one or more implementations, a computer implemented method includes determining, by the data storage system, a timeout value of an adaptive timeout parameter of the data storage system. The method includes determining whether a first host operation is received by the data storage system. In response to determining that the first host operation is not received, the method includes determining whether the timeout value satisfies a threshold value. In response to determining that the timeout value satisfies the threshold value, the method includes executing, by the data storage system, one or more background management operations.

In one or more implementations, a data storage system includes a non-volatile memory device and a controller. The controller configured to determine a timeout value of an adaptive timeout parameter of the data storage system. The controller configured to determine whether a first host operation is received. The controller configured to, when the first host operation is not received, determine whether the timeout value satisfies a threshold value. The controller configured to, when the timeout value satisfies the threshold value, cause one or more background management operations to be executed at the data storage system.

In one or more implementations, the data storage system includes means for determining a timeout value of an adaptive timeout parameter. The data storage system includes means for determining whether a first host operation is received. The data storage system, in response to determining that the first host operation is not received, includes means for determining whether the timeout value satisfies a threshold value. The data storage system, in response to determining that the timeout value satisfies the threshold value, includes means for executing one or more background management operations.

In one or more implementations, a non-transitory machine-readable medium includes machine-executable instructions thereon that, when executed by a processor, perform a method. The method includes determining, by the data storage system, a timeout value of an adaptive timeout parameter of the data storage system. The method includes determining whether a first host operation is received by the data storage system. In response to determining that the first host operation is not received, the method includes determining whether the timeout value satisfies a threshold value. In response to determining that the timeout value satisfies the threshold value, the method includes executing, by the data storage system, one or more background management operations.

It is understood that other configurations of the subject technology will become readily apparent to those skilled in the art from the detailed description herein, wherein various configurations of the subject technology are shown and described by way of illustration. The subject technology is capable of other and different configurations and its several details are capable of modification in various other respects, all without departing from the scope of the subject technology. Accordingly, the drawings and detailed description are to be regarded as illustrative in nature and not as restrictive.

Many of the above-described features of example process and related features and applications, may be implemented as software or firmware processes that are specified as a set of instructions recorded on a processor-readable storage medium (also referred to as computer-readable medium). When these instructions are executed by one or more processing unit(s) (e.g., one or more processors, cores of processors, or other processing units), the processing unit(s) are caused to perform the actions indicated in the instructions. Examples of processor-readable media include, but are not limited to, volatile memory, non-volatile memory, as well as other forms of media such as magnetic media, optical media, and electronic media. The processor-readable media does not include carrier waves and electronic signals communicated wirelessly or over wired connections.

The term "software" is meant to include, where appropriate, firmware residing in memory or applications stored in memory, which may be read into a working memory for processing by a processor. Also, in some implementations, multiple software aspects of the subject disclosure may be implemented as sub-parts of a larger program while remaining distinct software aspects of the subject disclosure. In some implementations, multiple software aspects may also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code).

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus the accompanying method claims present elements of the various steps in a sample order, and are not meant to be limited to the specific order or hierarchy presented.

The previous description is provided to enable any person skilled in the art to practice the various aspects described herein. The previous description provides various examples of the subject disclosure, and the subject disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

The phrases "in communication with" and "coupled" mean in direct communication with or in indirect communication with via one or more components named or unnamed herein (e.g., a memory card reader)

A phrase such as an "aspect" does not imply that such aspect is essential to the subject disclosure or that such aspect applies to all configurations of the subject disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject disclosure or that such implementation applies to all configurations of the subject disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A configuration may provide one or more examples. A phrase such as a "configuration" may refer to one or more configurations and vice versa.

The word "exemplary" is used to mean "serving as an example or illustration." Any aspect or design described herein as "exemplary" is not necessarily to be construed as preferred or advantageous over other aspects or designs.

What is claimed is:

1. A computer-implemented method for a data storage system, comprising:
   determining, by the data storage system, a timeout value of an adaptive timeout parameter of the data storage system, wherein the timeout value of the adaptive timeout parameter relates to a background management operation;
   determining whether a first host operation command is received by the data storage system;
   in response to determining that the first host operation command is not received:
      determining whether a timer value satisfies the timeout value; and
      in response to determining that the timer value satisfies the timeout value:
         executing, by the data storage system, one or more background management operations,
   wherein the timeout value of the adaptive timeout parameter is a duration of time commencing upon completing a host operation and ending upon initiating a background management operation,
   wherein the timeout value of the adaptive timeout parameter is a standby time period between a host operation and a background management operation,
   wherein the timeout value of the adaptive timeout parameter does not include a host operation time period and does not include a background management operation time period,
   wherein a system power is high when a host operation is executed,
   wherein the system power is low during the duration of time for the timeout value,
   wherein the system power is intermediate when a background management operation is executed,
   wherein the low system power is lower than the high system power,
   wherein the intermediate system power is higher than the low system power and lower than the high system power,
   wherein the timeout value of the adaptive timeout parameter is determined based on one or more criticality levels of the one or more background management operations of the data storage system,
wherein an increase in the one or more criticality levels of the one or more background management operations decreases the timeout value of the adaptive timeout parameter,
wherein the data storage system comprises a machine learned model configured to determine a likelihood of receiving a host operation, configured to determine a plurality of idle time values based on usage history of the data storage system, and configured to specify an accuracy level for each of the plurality of idle time values, and
wherein the timeout value of the adaptive timeout parameter is determined based on one of the plurality of idle time values having a highest accuracy level.

2. The computer-implemented method of claim 1, wherein the timeout value of the adaptive timeout parameter is determined based on the one or more criticality levels of the one or more background management operations of the data storage system, and based on a random generated number or a likelihood of receiving a second host operation command by the data storage system.

3. The computer-implemented method of claim 2,
wherein the one or more criticality levels of the one or more background management operations are based on an amount and a severity of the one or more background management operations, and
wherein the timeout value of the adaptive timeout parameter is determined based on the amount and the severity of the one or more background management operations.

4. The computer-implemented method of claim 2, wherein the likelihood of receiving the second host operation command is based on a usage data of the data storage system.

5. The computer-implemented method of claim 1, wherein determining the timeout value of the adaptive timeout parameter comprises:
determining an amount of the one or more background management operations based on one or more of an indicator of a utilization of the data storage system, a type of host commands, or one or more operating environment parameters of the data storage system.

6. The computer-implemented method of claim 5,
wherein the indicator represents a ratio between a busy time and an idle time of the data storage system, and
wherein the timeout value of the adaptive timeout parameter is determined based on the indicator representing the ratio between the busy time and the idle time of the data storage system.

7. The computer-implemented method of claim 1, wherein determining the timeout value of the adaptive timeout parameter comprises:
determining a severity of the one or more background management operations based on one or more of a bit error rate of a memory block of a non-volatile memory device or an occupancy level of the non-volatile memory device.

8. The computer-implemented method of claim 1, further comprising:
in response to determining that the first host operation command is received:
performing a first host operation of the first host operation command, wherein a priority level associated with the first host operation is higher than a priority level associated with the one or more background management operations.

9. The computer-implemented method of claim 1, wherein:
the one or more criticality levels of the one or more background management operations comprise at least an urgency grade of the one or more background management operations;
the timeout value of the adaptive timeout parameter is determined inversely with respect to the at least an urgency grade of the one or more background management operations; and
an increase in the at least an urgency grade decreases the timeout value.

10. The computer-implemented method of claim 1, wherein:
the one or more criticality levels of the one or more background management operations comprise at least an urgency grade of the one or more background management operations; and
the computer-implemented method comprises:
periodically updating the at least an urgency grade of the one or more background management operations; and
periodically updating the timeout value of the adaptive timeout parameter based on the updated at least an urgency grade of the one or more background management operations.

11. The computer-implemented method of claim 1, wherein:
the one or more criticality levels of the one or more background management operations are based on a number of background management operations required to be processed; and
the number of background management operations required to be processed is based on voltage events of the data storage system.

12. A data storage system, comprising:
a non-volatile memory device; and
a controller,
wherein the controller is configured to:
determine a timeout value of an adaptive timeout parameter of the data storage system, wherein the timeout value of the adaptive timeout parameter relates to a background management operation;
determine whether a first host operation command is received;
when the first host operation command is not received:
determine whether a timer value satisfies the timeout value; and
when the timer value satisfies the timeout value, cause one or more background management operations to be executed at the data storage system,
wherein the timeout value of the adaptive timeout parameter is a duration of time commencing upon completing a host operation and ending upon initiating a background management operation,
wherein the timeout value of the adaptive timeout parameter is a standby time period between a host operation and a background management operation,
wherein the timeout value of the adaptive timeout parameter does not include a host operation time period and does not include a background management operation time period,
wherein a system power is high when a host operation is executed, wherein the system power is low during the duration of time for the timeout value, wherein the system power is intermediate when a background management operation is executed, wherein the low system power is lower than the high system power, wherein the intermediate system power is higher than the low system power and lower than the high system power, wherein the controller is configured to determine the timeout value of the adaptive timeout parameter based on one or more criticality levels of the one or more background management operations or a random generated number, wherein an increase in the one or more criticality levels of the one or more background management operations decreases the timeout value of the adaptive timeout parameter,.

wherein the data storage system comprises a machine learned model configured to determine a likelihood of receiving a host operation, configured to determine a plurality of idle time values based on usage history of the data storage system, and configured to specify an accuracy level for each of the plurality of idle time values, and wherein the controller is configured to determine the timeout value of the adaptive timeout parameter based on one of the plurality of idle time values having a highest accuracy level.

13. The data storage system of claim 12, wherein the controller is configured to determine the timeout value based on the one or more criticality levels of the one or more background management operations, and based on the random generated number or a system history.

14. The data storage system of claim 13,
wherein the one or more criticality levels of the one or more background management operations are based on at least one of an amount and a severity of the one or more background management operations, and
wherein the controller is configured to determine the timeout value of the adaptive timeout parameter based on the amount and the severity of the one or more background management operations.

15. The data storage system of claim 14, wherein the amount of the one or more background management operations is based on one or more of an indicator of a utilization of the data storage system, a type of host commands, or one or more operating environment parameters.

16. The data storage system of claim 15, wherein the indicator represents a ratio between a busy time of the data storage system and an idle time of the data storage system.

17. The data storage system of claim 14, wherein the controller is configured to:
determine the severity of the one or more background management operations based on one or more of a bit error rate of a memory block of the non-volatile memory device or a relocation operation.

18. The data storage system of claim 12, wherein the timeout value is based on a likelihood of receiving a second host operation command.

19. The data storage system of claim 12, wherein the controller is configured to:
when the first host operation command is received,
cause a first host operation of the first host operation command to be executed, wherein a priority level associated with the first host operation is higher than a priority level associated with the one or more background management operations.

20. A data storage system, comprising:
means for determining a timeout value of an adaptive timeout parameter, wherein the timeout value of the adaptive timeout parameter relates to a background management operation;
means for determining whether a first host operation command is received;
in response to determining that the first host operation command is not received:
means for determining whether a timer value satisfies the timeout value; and
in response to determining that the timer value satisfies the timeout value:
means for executing one or more background management operations,
wherein the timeout value of the adaptive timeout parameter is a duration of time commencing upon completing a host operation and ending upon initiating a background management operation,
wherein the timeout value of the adaptive timeout parameter is a standby time period between a host operation and a background management operation,
wherein the timeout value of the adaptive timeout parameter does not include a host operation time period and does not include a background management operation time period,
wherein a system power is high when a host operation is executed,
wherein the system power is low during the duration of time for the timeout value,
wherein the system power is intermediate when a background management operation is executed,
wherein the low system power is lower than the high system power,
wherein the intermediate system power is higher than the low system power and lower than the high system power,
wherein the means for determining the timeout value of the adaptive timeout parameter comprises means for determining the timeout value of the adaptive timeout parameter based on one or more criticality levels of the one or more background management operations of the data storage system or a random generated number,
wherein an increase in the one or more criticality levels of the one or more background management operations decreases the timeout value of the adaptive timeout parameter,
wherein the data storage system comprises a machine learned model configured to determine a likelihood of receiving a host operation, configured to determine a plurality of idle time values based on usage history of the data storage system, and configured to specify an accuracy level for each of the plurality of idle time values, and
wherein the means for determining the timeout value of the adaptive timeout parameter comprises means for determining the timeout value of the adaptive timeout parameter based on one of the plurality of idle time values having a highest accuracy level.

* * * * *